(12) United States Patent
Lee et al.

(10) Patent No.: US 6,366,549 B1
(45) Date of Patent: Apr. 2, 2002

(54) CIRCUIT FOR DETECTING THE MIRROR SIGNAL IN AN OPTICAL DISK DRIVE AND METHOD THEREFOR

(75) Inventors: Seung-Ho Lee; Gea-Ok Cho; Chun-Sup Kim, all of Suwon-shi (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/466,069

(22) Filed: Dec. 17, 1999

(30) Foreign Application Priority Data

Dec. 17, 1998 (KR) .............................. 98-55901

(51) Int. Cl.⁷ ................................. G11B 7/00
(52) U.S. Cl. ............................. 369/112.05; 369/44.28; 369/44.34; 369/112.11; 369/112.15
(58) Field of Search .......................... 369/44.34, 44.35, 369/44.28, 44.29, 44.26, 53.22, 44.36, 124.05, 124.11, 124.12, 124.15

(56) References Cited

U.S. PATENT DOCUMENTS

| 5,140,573 A | * | 8/1992 | Ando | 369/44.28 |
| 5,592,456 A | * | 1/1997 | Miyashita et al. | 369/59.18 |
| 5,841,751 A | * | 11/1998 | Komazaki et al. | 369/124.05 |
| 6,282,157 B1 | * | 5/2001 | Kim et al. | 369/44.35 |

FOREIGN PATENT DOCUMENTS

| JP | 409219027 A | * | 8/1997 |
| JP | 410134379 A | * | 5/1998 |
| JP | 410172147 A | * | 6/1998 |

* cited by examiner

Primary Examiner—Thang V. Tran
(74) Attorney, Agent, or Firm—Sughrue Mion, PLLC (57) ABSTRACT

A circuit for detecting the mirror signal from the output signal of an RF (radio frequency) in an optical disk drive, includes a first peak hold circuit for holding the peak value of the output signal of the RF amplifier to provide a first peak value, a first bottom hold circuit for holding the bottom value of the output signal of the RF amplifier to provide a first bottom value, a differential amplifier for amplifying the difference between the first and second peak values, a second peak hold circuit for holding the peak value of the output signal of the differential amplifier to provide a second peak value, a second bottom hold circuit for holding the bottom value of the output signal of the differential amplifier to provide a second bottom value, a centered value extractor for processing the second peak and bottom values to extract the centered value of the output signal of the RF amplifier, a comparator for comparing the centered value with the output signal of the differential amplifier to generate the mirror signal, and a hold time constant adjustment circuit connected between the centered value extractor and the second peak and bottom hold circuits to adjust the time constants of the second peak and bottom hold circuits according to a change of the level of the output signal of the RF amplifier.

9 Claims, 10 Drawing Sheets

FIG. 1

CONVENTIONAL ART

FIG. 2

CONVENTIONAL ART

FIG. 3

CONVENTIONAL ART

FIG. 4

CONVENTIONAL ART

CIRCUIT FOR DETECTING THE MIRROR SIGNAL IN AN OPTICAL DISK DRIVE AND METHOD THEREFOR

BACKGROUND OF THE INVENTION

1. Field of the Invention

The present invention relates to an optical disk drive, and more particularly to a circuit for detecting the mirror signal used for counting the number of the tracks of the optical disk jumped, and a method therefore. The present application is based on Korean Patent Application No. 98-55901, which is incorporated herein by reference.

2. Description of the Related Art

The mirror signal is generated when the pickup of an optical disk drive jumps from one track of a disk to another, and is used to count the number of the tracks jumped. It is very important for the pickup to correctly jump a desired number of tracks since the performance of the optical disk drive depends on the speed of searching a data position targeted on the disk. Such mirror signal is detected by a mirror circuit connected with a RF (radio frequency) amplifier.

Figure 1:
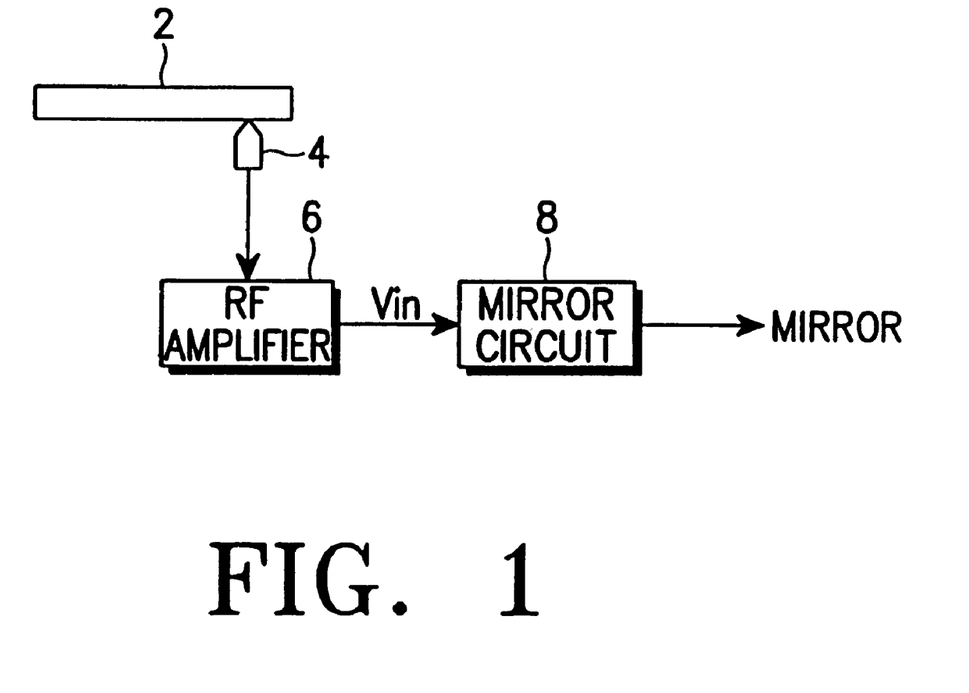
FIG. 1 is a block diagram for illustrating the detection of the mirror signal in an optical disk drive.

Referring to FIG. 1, the data recorded on the optical disk 2 is picked up by the pickup 4 to generate data signals amplified by the RF amplifier 6. A part of the data signals is applied to the mirror circuit 8 to perform the bottom hold and peak hold. Conventionally, the peak hold is a tracking signal of 30 KHz set by a time constant to be tracked down, while the bottom hold is set by a time constant for the fluctuation of the envelope to be tracked down in a cycle.

Figure 2:
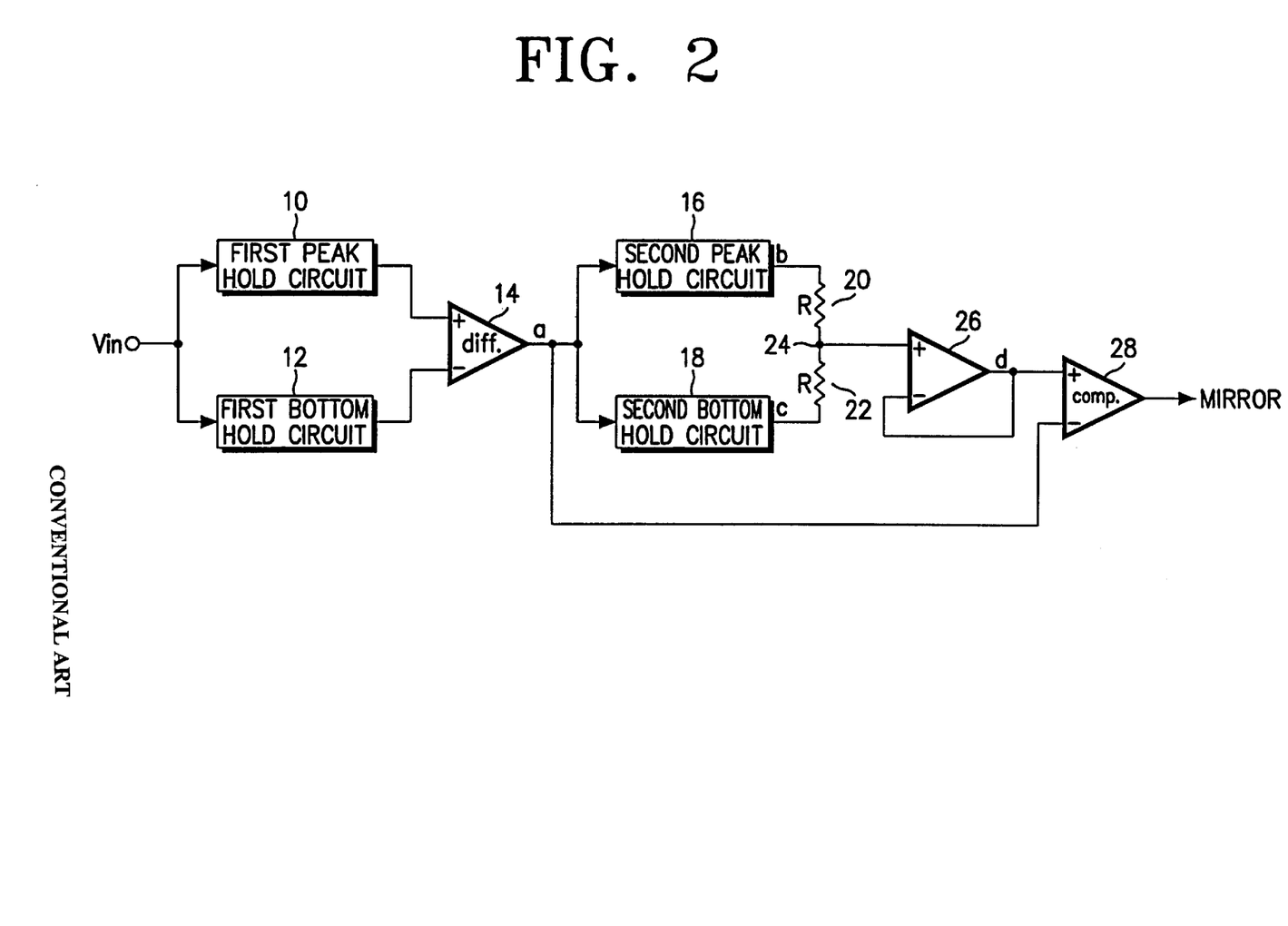
FIG. 2 is a block diagram for illustrating a conventional mirror circuit.
Figure 3:
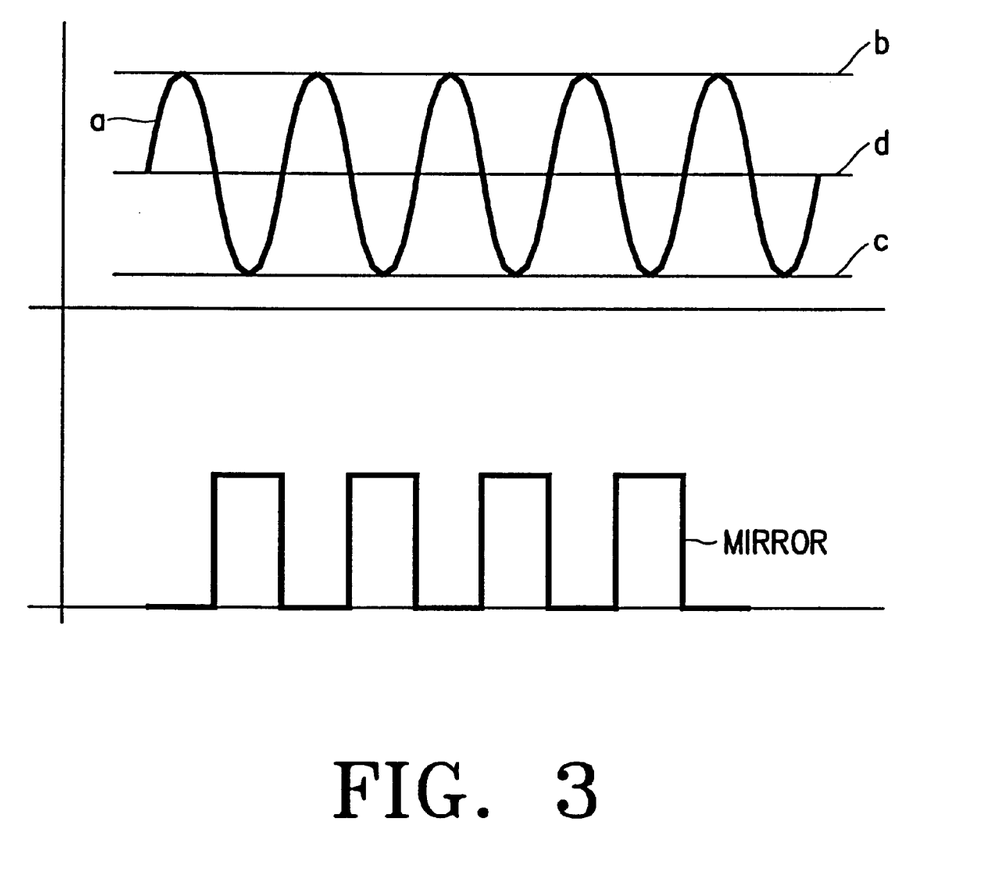
FIG. 3 shows the waveforms generated by the circuit of FIG. 2 with a constant DC level of an input signal.
Figure 4:
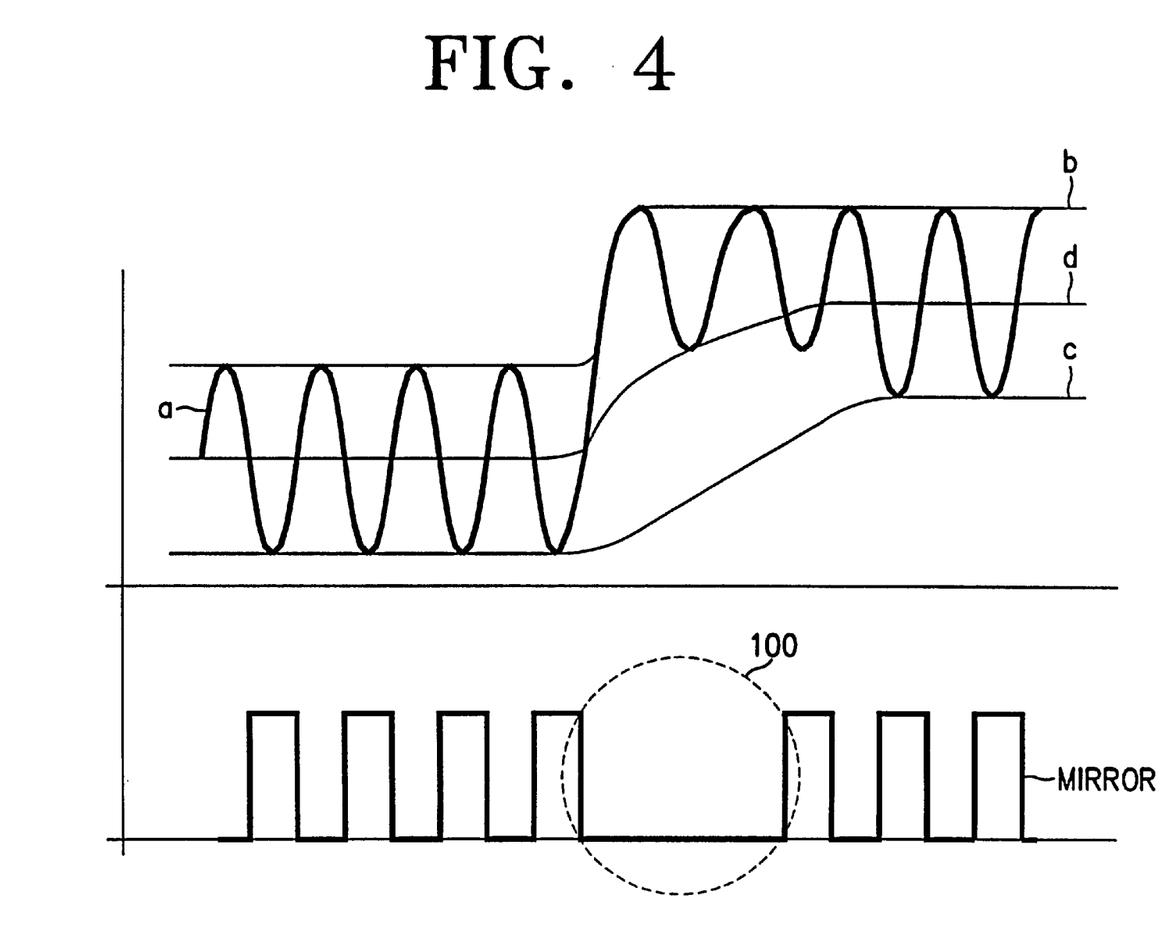
FIG. 4 shows the waveforms generated by the circuit of FIG. 2 with an abruptly changing DC level of an input signal.

FIG. 2 is a block diagram for illustrating an example of the conventional mirror circuit, FIG. 3 the waveforms generated by the circuit of FIG. 2 with a constant DC level of the input signal, and FIG. 4 the waveforms with a rapidly fluctuated DC level of the input signal. The operation of the mirror circuit is described as follows:

First, the input signal Vin from the RF amplifier 6 is delivered to a first peak hold circuit 10 to hold the peak value, and to a first bottom hold circuit 12 to hold the bottom value. The difference between the peak and the bottom value is amplified by a differential amplifier 14 to generate a waveform as indicated by reference symbol "a" in FIG. 3. The differential amplifier is connected with a logic circuit for detecting the centered value, which comprises a second peak hold circuit 16, second bottom hold circuit 18, resistors 20, 22, and buffer 26. The amplified signal "a" of the differential amplifier is delivered to both the second peak and bottom hold circuits 16 and 18 to respectively hold the peak value "b" and the bottom value "c" as shown in FIG. 3. The output of the second peak hold circuit 16 is connected through the resistor of resistance "R" to a node 24, while the output of the bottom hold circuit 18 is connected through the resistor of same resistance "R" to the node 24. The node 24 is also connected to the non-inverted input (+) of the buffer 26, so that the output of the buffer 26 has the value "d" centered between the peak value "b" and the bottom value "c". The centered value "d" is applied to the non-inverted input (+) of a comparator 28, which compares it with the output value "a" of the differential amplifier 14 received through the inverted input (−) to generate a mirror signal.

In this case, if the input signal Vin from the RF amplifier 6 has a constant DC level, the mirror signal has the normal waveform as shown in FIG. 3. However, if the DC level of the input signal Vin is abruptly changed due to a certain cause, the mirror signal has an abnormal waveform as shown in FIG. 4, because it is impossible to correctly detect the centered value "d" between the peak and bottom values. Namely, the mirror signal includes such error as indicated by reference numeral 100 in FIG. 4. The cause of abruptly changing the DC level of the input signal Vin may be a wobble signal loaded on the disk as in CD-RW (Compact Disk-ReWritable) or DVD-RAM (Digital Versatile Disk-Random Access Memory), or a header signal inputted in case of CD or DVD, or a defect existing in the disk. The header signal inherently has a greater DC level than the data signal.

More specifically, the second peak hold circuit 16 as shown in FIG. 2 correctly detects the peak value "b" due to the relatively rapid charging time constant when the input signal from the RF amplifier 6 has an abruptly increasing DC value, but cannot correctly detect the peak value "b" due to the relatively slow discharging time constant when the DC value abruptly decreases. On the contrary, the second bottom hold circuit 18 cannot correctly detect the bottom value "c" due to the relatively slow charging time constant when the DC value of the input signal abruptly increases, but correctly detects the bottom value "c" due to the relatively rapid discharging time constant when the DC value rapidly decreases. Accordingly, the mirror circuit generates the centered value "d" of the abnormal waveform when the DC value of the input signal rapidly increases, so that the error 100 is generated in the mirror signal MIRROR, as shown in FIG. 4.

SUMMARY OF THE INVENTION

It is an object of the present invention to provide a circuit for correctly detecting the mirror signal regardless of variation of the DC level of the input signal that is picked up from a disk of an optical disk drive, and then amplified by the RF amplifier, and a method therefore.

It is another object of the present invention to provide an optical disk drive with a circuit for correctly detecting the centered value of the input signal rapidly changing during detection of the mirror signal.

According to an aspect of the present invention, a circuit for detecting the mirror signal from the output signal of an RF (radio frequency) amplifier for amplifying the signal picked up from a disk of an optical disk drive with a radio frequency, comprises a first peak hold circuit for holding the peak value of the output signal of the RF amplifier to provide a first peak value, a first bottom hold circuit for holding the bottom value of the output signal of the RF amplifier to provide a first bottom value, a differential amplifier for amplifying the difference between the first and second peak values, a second peak hold circuit for holding the peak value of the output signal of the differential amplifier to provide a second peak value, a second bottom hold circuit for holding the bottom value of the output signal of the differential amplifier to provide a second bottom value, a centered value extractor for processing the second peak and bottom values to extract the centered value of the output signal of the RE amplifier, a comparator for comparing the centered value with the output signal of the differential amplifier to generate the mirror signal, and a hold time constant adjustment circuit connected between the centered value extractor and the second peak and bottom hold circuits to adjust the time constants of the second peak and bottom hold circuits according to a change of the level of the output signal of the RF amplifier.

According to another aspect of the present invention, a method of detecting the mirror signal used for counting the number of tracks of a disk jumped by the pickup of an optical disk drive, comprises the steps of detecting the difference between the peak and bottom values of a whole signal read by the pickup during the jumping so as to generate a differential signal, obtaining the centered value between the peak and bottom values of the differential signal, adjusting the charging and discharging time constants used for detection of the peak and bottom values of the differential signal according to the variation between the peak and bottom values of the differential signal, and comparing the differential signal with the centered value according to the variation of the charging and discharging time constants so as to generate the mirror signal.

According to still another aspect of the present invention, an optical disk drive comprises an optical disk, a pickup for reading data recorded on the optical disk to generate a whole signal, a mirror signal detector for detecting the difference between the peak and bottom values of the whole signal to generate a differential signal, obtaining the centered value between the peak and bottom values of the differential signal, adjusting the charging and discharging time constants used for detection of the peak and bottom values of the differential signal according to variation between the peak and bottom values of the differential signal, and comparing the centered value according to variation of the charging and discharging time constants with the differential signal so as to generate the mirror signal, and a servo controller for counting the number of the tracks jumped by the pickup according to the mirror signal to move the pickup to a targeted track.

The present invention will now be described more specifically with reference to the drawings attached only by way of example.

DETAILED DESCRIPTION OF THE PREFERRED EMBODIMENT

Throughout the attached drawings the same reference numerals are used to indicate the same functional parts for the sake of convenience. In addition, detailed descriptions are omitted concerning the conventional parts, where such descriptions are unnecessary for understanding the invention.

Figure 9:
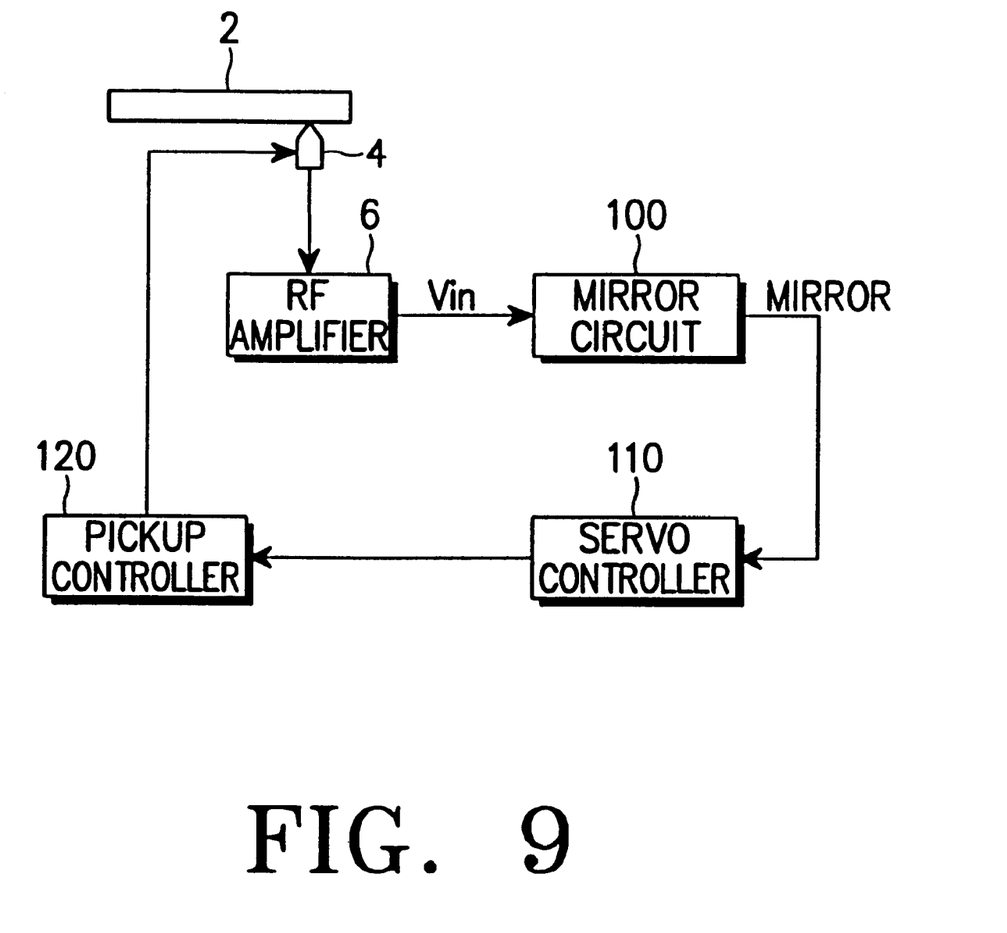
FIG. 9 is a block diagram for illustrating an optical disk drive provided with a servo controller for controlling the pickup by detection of the mirror signal according to the present invention.

The inventive mirror circuit is designed to correctly obtain the centered value between the peak and bottom values of the input signal (output of the RF amplifier) by adjusting the time constants of the peak and bottom hold circuits when the input signal is abruptly changed during detection of the mirror signal. Referring to FIG. 9, the optical disk drive comprises an optical disk 2, pickup 4, RF amplifier 6, mirror circuit 100, servo controller 110, and pickup controller 120 according to the present invention. Data read by the pickup 4 from the optical disk is amplified by the RF amplifier 6 to generate a whole signal Vin inputted into the mirror circuit 100. If the pickup 4 consists of four photodiodes a, b, c and d, the whole signal is the sum of the outputs of the four photodiodes, applied as the input signal Vin of the mirror circuit 100.

The mirror circuit 100 detects the difference between the peak and bottom values of the input signal Vin generated by the RF amplifier 6 to generate a difference signal, whose peak and bottom values in turn are detected to obtain their centered value. It also detects the variation between the peak and bottom values of the differential signal to adjust the charging and discharging time constants used for the detection of the peak and bottom values of the differential signal, and then, compares the differential signal with the centered value according to the variations of the charging and discharging time constants to generate the mirror signal MIRROR supplied to the servo controller 110. The servo controller 110 counts the number of tracks jumped by the pickup according to the mirror signal MIRROR to generate a servo control signal applied to the pickup controller 120 to move the pickup to a targeted track.

Figure 5:
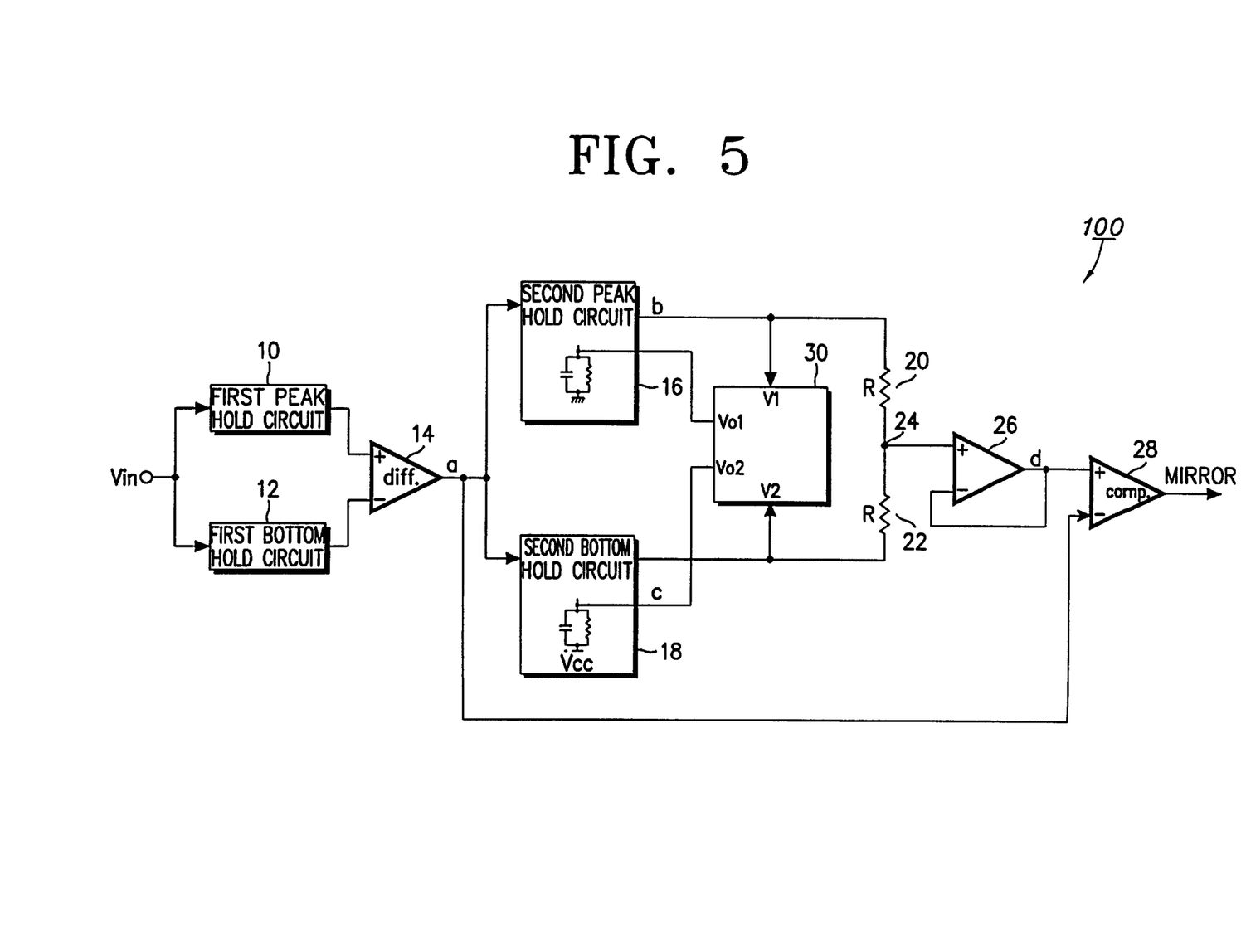
FIG. 5 is a block diagram for illustrating the inventive mirror circuit.

Referring to FIG. 5, the inventive mirror circuit 100 is characterized by a hold time constant adjustment circuit 30 combined with a conventional mirror circuit 8 illustrated in FIG. 2. The hold time constant adjustment circuit 30 has two inputs V1 and V2, one input of which is connected to the output of the second peak hold circuit 16, and the other to that of the second bottom hold circuit 18. It also has two outputs Vo1 and Vo2 respectively connected to the second peak and bottom hold circuits 16 and 18. The hold time constant adjustment circuit 30 does not work when the input signal (output of the RF amplifier) has a constant DC level during detection of the mirror signal, so that the mirror circuit of FIG. 5 works in the same way as that of FIG. 2. However, when the DC level of the input signal abruptly changes, it correctly adjusts the time constants of the second peak and bottom hold circuits 16 and 18 so as to cause the mirror circuit 100 of FIG. 5 to correctly obtain the centered value between the peak and bottom values.

Figure 6:
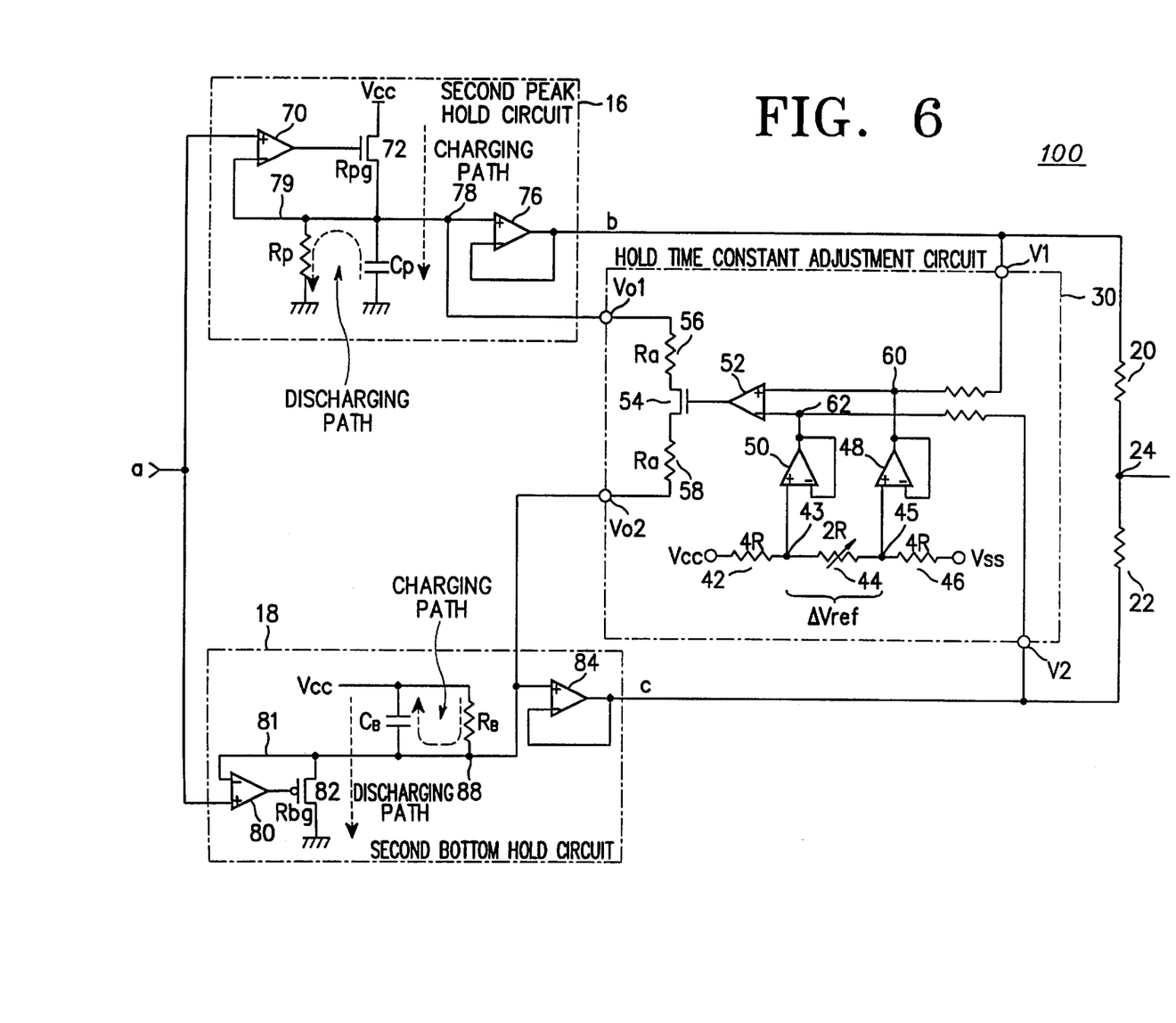
FIG. 6 is a schematic circuit diagram for detailing the second peak hold circuit (16), second bottom hold circuit (18), and hold time constant adjustment circuit (30) of the inventive mirror circuit as shown in FIG. 5.

Referring to FIG. 6, the hold time constant adjustment circuit 30 includes a comparator 52, whose non-inverted input (+) is connected to the one input V1 supplied with the peak value "b" of the second peak hold circuit 16, and the inverted input (−) to the other input V2 supplied with the bottom value "c" of the second bottom hold circuit 18. The output of the comparator 52 is connected to the gate of an N-channel MOS transistor (hereinafter referred to as N-channel transistor) 54, one end of which is connected through a resistor 56 of resistance $R_a$ to the one output Vo1 of the hold time constant adjustment circuit 30, and the other end through a resistor 58 of resistance $R_a$ to the other output Vo2. The resistors 56 and 58 have values of a few kΩ, which are considerably lower than those of a few hundreds kΩ of the resistors $R_P$ and $R_B$ of the second peak and bottom hold circuits 16 and 18. Three additional resistors 42, 44 and 46 are connected in series between a source voltage Vcc and ground voltage Vss. The node 43 between the resistors 42 and 44 is connected to the non-inverted input (+) of a buffer 50 while the node 45 between the resistors 44 and 46 is connected to the non-inverted input (+) of a buffer 48. There exists a voltage difference ΔVref between the nodes 43 and 45. Namely, the node 43 maintains a voltage greater by ΔVref than the node 45. This voltage difference ΔVref is the reference voltage provided to detect an abrupt change of the DC level of the input signal (output of the RF amplifier 6). The resistor 44 may be a variable resistor to allow a designer to vary the voltage difference ΔVref. The output of the buffer 48 is connected to the node 60 between the one input V1 and the non-inverted input (+) of the comparator 52, and the output of the buffer 50 to the node 62 between the other input V2 and the inverted input (−) of the comparator 52.

The second peak hold circuit 16 has an amplifier 70 with the non-inverted input (+) connected to the output of the differential amplifier 14 of FIG. 5, and the output connected to the gate of an N-channel transistor 72, the drain of which is connected with the source voltage Vcc, and the source through a capacitor $C_p$ to ground. The source of the N-channel transistor 72 is also connected through a line 79 to the inverted input (−) of the amplifier 70. Also connected to the line 79 is a resistor $R_p$ with one end grounded. The resistor $R_p$ has a large resistance of a few hundreds kΩ to retard discharging. The N-channel transistor 72 has a relatively small turn-on resistance $R_{pg}$ of a few tens Ω for quick charging. The source of the N-channel transistor 72 is connected to the non-inverted input (+) of a buffer 76 with their node 78 connected to the output Vo1 of the hold time constant adjustment circuit 30.

Meanwhile, the second bottom hold circuit 18 includes an amplifier 80, the non-inverted input (+) of which is connected to the output of the differential amplifier 14, and the output of the differential amplifier is connected to the gate of P-channel MOS transistor (hereinafter referred to as P-channel transistor) 82. The source of the P-channel transistor 82 is connected through a line 81 to the inverted input (−), and through a capacitor $C_B$ to the source voltage Vcc. A resistor $R_B$ is connected in parallel with the capacitor $C_B$. The resistor $R_B$ has a relatively large resistance of a few hundreds kΩ for slow charging while the P-channel transistor 82 has a relatively small resistance $R_{bg}$ of a few tens Ω for quick discharging. The source of the P-channel transistor 82 is connected to the non-inverted input (+) of a buffer 84, the output of which is connected to the other input V2 of the hold time constant adjustment circuit 30. The node 88 between the buffer 84 and the source of the P-channel transistor 82 is connected to the other output Vo2 of the hold time constant adjustment circuit 30.

Hereinafter, the operation of the mirror circuit is described. Firstly, when the DC level of the input signal (output of the RF amplifier 6 as shown in FIG. 9) is constant, the output signal "a" of high level of the differential amplifier 14 is applied to the second peak and bottom hold circuits 16 and 18. The signal "a" applied to the second peak hold circuit 16 is supplied through the amplifier 70 to the gate of the N-channel transistor 72. Then, the N-channel transistor 72 is turned on to charge the capacitor $C_p$ with the source voltage. In this case, the charging is quickly achieved because the N-channel transistor 72 has a relatively small turn-on resistance $R_{pg}$ of a few tens Ω, where the charging time constant $\tau_{rp}$ is $R_{pg}C_p$. Thereafter, when the signal "a" of low level is supplied to the gate of the N-channel transistor 72, the capacitor $C_p$ is discharged through the discharging path consisting of the resistor $R_p$ and ground. In this case, the discharging is retarded because the resistor $R_p$ has a relatively large resistance of a few hundreds kΩ, where the discharging time constant $\tau_{fp}$ is $R_pC_p$. Consequently, the peak value "b" is generated from the second peak hold circuit, as shown in FIG. 3.

Meanwhile, when the signal "a" of low level is supplied through the amplifier 80 to the gate of the P-channel transistor 82, the P-channel transistor is turned on to discharge the capacitor $C_B$ through the discharging path consisting of the P-channel transistor 82 and ground. In this case, the discharging is quickly achieved because the P-channel transistor 82 has a relatively small resistance $R_{bg}$ of a few tens Ω, where the discharging time constant $\tau_{fb}$ is $R_{bg}C_B$. Thereafter, when the signal "a" of high level is supplied to the gate of the P-channel transistor 82, the P-channel transistor 82 is turned off to charge the capacitor $C_B$ with the source voltage Vcc through the resistor $R_B$. In this case, the charging is retarded because the resistor $R_B$ has a relatively large resistance of a few hundreds kΩ, where the charging time constant $\tau_{rb}$ is $R_BC_B$. Consequently, the bottom value "c" is generated from the second bottom hold circuit 18, as shown in FIG. 3.

When the peak and bottom values "b" and "c" as shown in FIG. 3 are applied to the hold time constant adjustment circuit 30, the following Formula 1 is established:

$$b-c < \Delta Vref \quad \text{Formula 1}$$

Wherein ΔVref is the reference voltage provided by the hold time constant adjustment circuit 30. Then, the output of the comparator 52 becomes logically low. More specifically, if we assume that the signal applied to the non-inverted input (+) of the comparator 52 is the peak value "b", the signal applied to the inverted input (−) is the sum of the bottom value "c" and reference value ΔVref. Hence, if b<(ΔVref+c), the output of the comparator 52 becomes logically low, thereby turning off the N-channel transistor 54. Consequently, the hold time constant adjustment circuit 30 does not work, the inventive mirror circuit 100 as shown in FIG. 5 operates as in the normal operation of the conventional mirror circuit 8 as shown in FIG. 2, generating the mirror signal as shown in FIG. 3.

On the contrary, when the DC level of the input signal (output of the RF amplifier 6) abruptly changes, the hold time constant adjustment circuit 30 provides the following Formula 2:

$$b-c > \Delta Vref \quad \text{Formula 2}$$

Wherein ΔVref is the reference voltage provided by the hold time constant adjustment circuit 30. Then, the output of the comparator 52 becomes logically high. More specifically, if we assume that the signal applied to the non-inverted input (+) of the comparator 52 is the peak value "b", the signal applied to the inverted input (−) is the sum of the bottom value "c" and the reference voltage ΔVref. Thus, the output of the comparator 52 becomes logically high because b>(ΔVref+c), turning on the N-channel transistor 54. Consequently, the second peak hold circuit 16 discharges the capacitor $C_p$ through the discharging path of $C_p$→node 78→resistor 56→N-channel transistor 54→resistor 58→node 88→P-channel transistor 82→ground that is different from the ordinary path. In this case, the discharging time constant $\tau_{fp}$ is $(2R_a+R_{bg})C_p$, which is considerably small than the previous discharging constant $\tau_{fp}=R_pC_p$. For example, the value of the resistor $R_a$ is a few kΩ while the value of the resistor $R_p$ is a few hundreds kΩ, so that the discharging is performed much more quickly than in the previous discharging path. Consequently, even when the DC level of the input signal (output of the RF amplifier 6) abruptly decreases, it is possible to correctly detect the peak value "b" of the output signal "a" of the differential amplifier 14, and thus the centered value "d" generated from the buffer 26 of FIG. 5.

Meanwhile, as the N-channel transistor 54 of the hold time constant adjustment circuit 30 is turned on, the second bottom hold circuit 18 charges the capacitor $C_B$ with the source voltage of the second peak hold circuit 16 through the charging path of Vcc→N-channel transistor 72→node 78→resistor 56→resistor 58→node 88→capacitor $C_B$. In this case, the charging time constant $\tau_{rb}$ is $(2R_a+R_{pg})C_B$, which is considerably smaller than the previous charging time constant $\tau_{rb}=R_B C_B$. For the value of the resistor $R_a$ is a few kilos Ω. and the resistance $R_{pg}$ a few kΩ, while the value of the resistor $R_B$ is a few hundreds kΩ. Hence, the charging is much more quickly achieved than in the previous charging path. Consequently, even when the DC level of the input signal (output of the RF amplifier 6) abruptly rises, it is possible to correctly detect the bottom value "c" of the output signal "a" of the differential amplifier 14, and thus the centered value "d" generated from the buffer 26 of FIG. 5.

Figure 7:
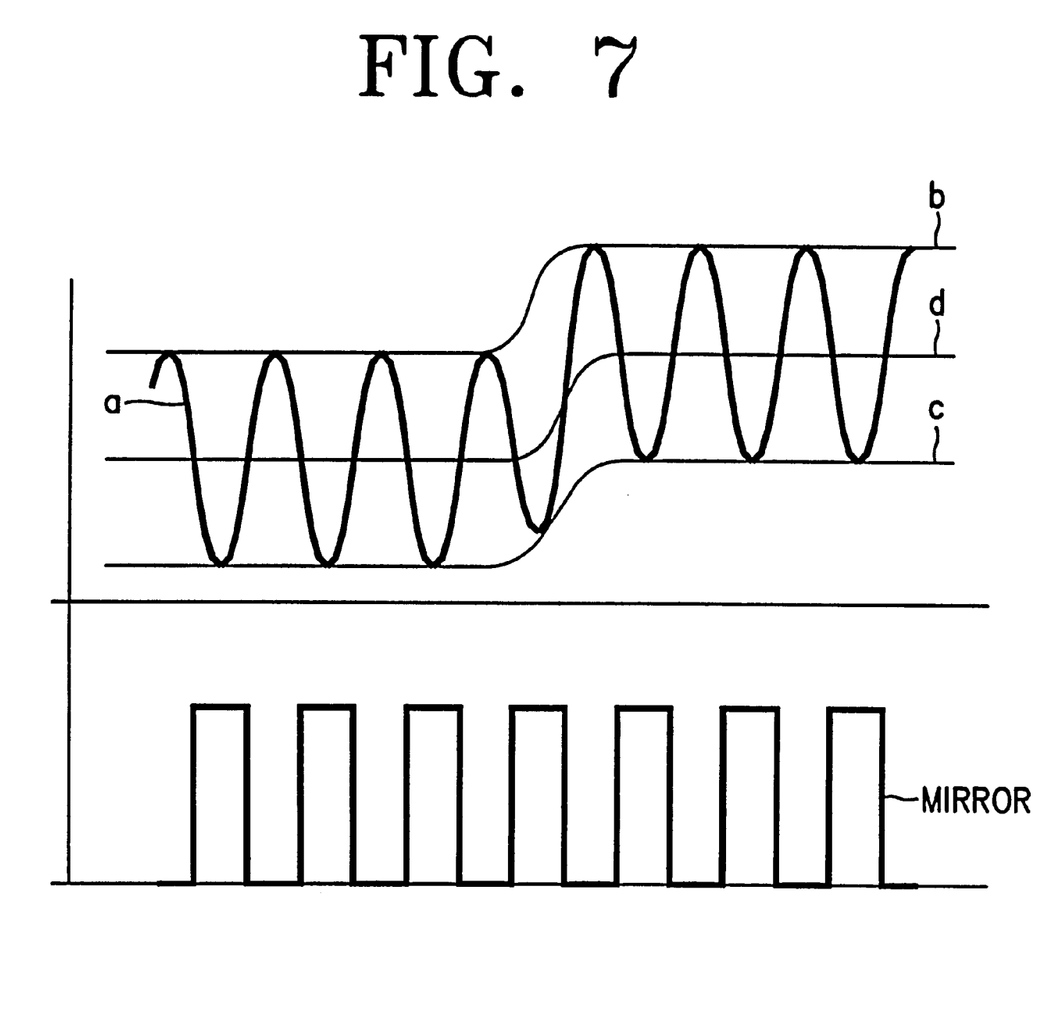
FIG. 7 is the waveforms generated by the inventive circuit as shown in FIG. 5 with an abruptly changing DC level of an input signal.

Thus, when the DC level of the input signal (output of the RF amplifier 6) abruptly changes, the hold time constant adjustment circuit 30 adjusts the time constants of the second peak and bottom hold circuits 16 and 18, so that the mirror circuit of FIG. 5 may correctly obtain the centered value of the peak and bottom values. For example, referring to FIG. 7, when the DC level of the input signal abruptly rises, the bottom hold circuit 18 performs quick charging to pursue the correct bottom value "c", which is different from the case of FIG. 4. Accordingly, there is obtained the correct centered value "d".

Figure 8A:
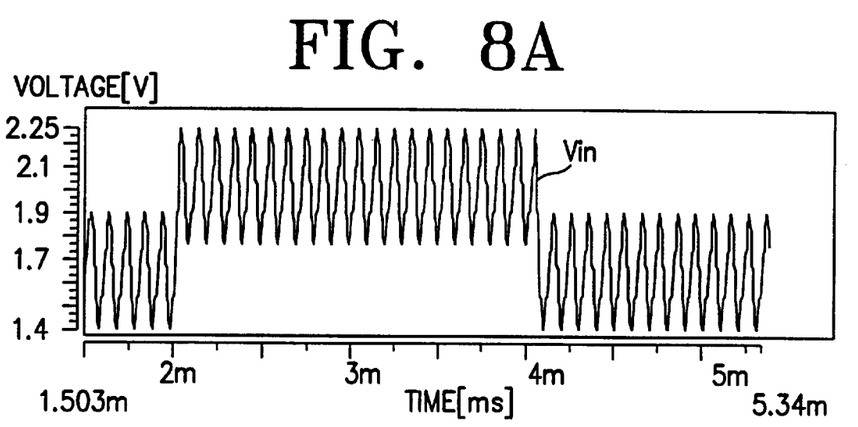
FIGS. 8A to 8D show a simulation of waveforms obtained by a signal analyzer in order hit to compare the inventive circuit with the conventional circuit.
Figure 8B:
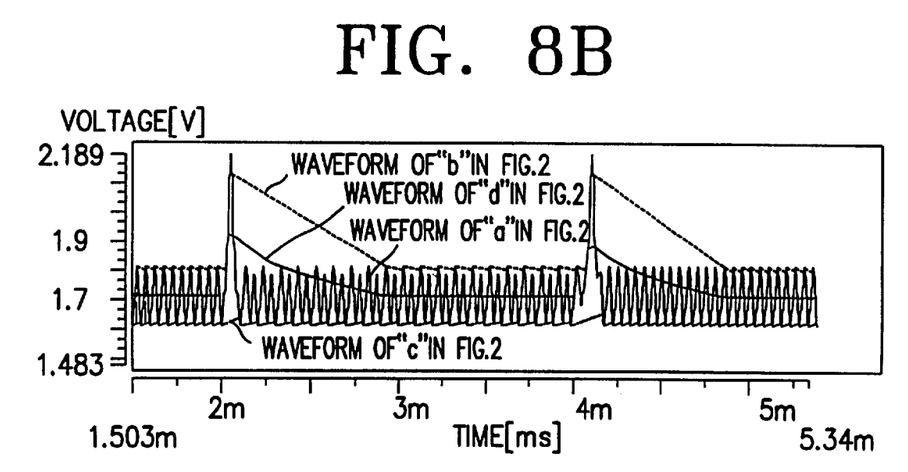
Figure 8C:
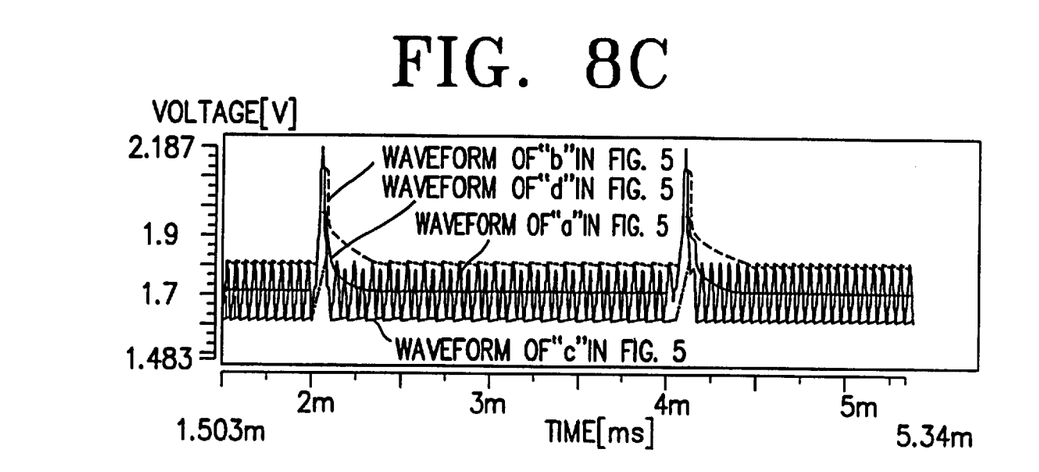
Figure 8D:
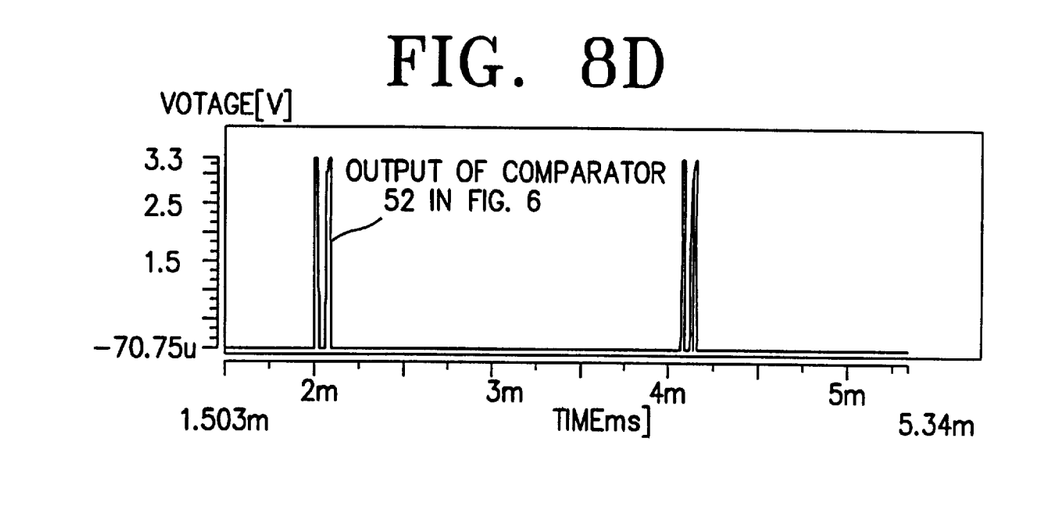

FIGS. 8A to 8D are signal analyzer simulations of the waveforms for comparing the inventive circuit with the conventional one. FIG. 8A represents an example of the input signal Vin supplied from the RF amplifier 6 to the mirror circuit, FIG. 8B the output "a" of the differential amplifier 14, peak value "b", bottom value "c" and centered value "d" according to the conventional circuit, FIG. 8C those of the inventive circuit, and FIG. 8D the output of the comparator 52 of FIG. 6. Comparing FIG. 8b with FIG. 8C, it is readily noted that the inventive mirror circuit 100 generates the correct centered value of the peak and bottom values of the output signal "a" from the differential amplifier 14 even when the input signal (output of the RF amplifier) abruptly changes. Thus, the inventive mirror circuit may adjust the time constants of the peak and bottom hold circuits so as to generate the correct mirror signal even when the output signal of the RF amplifier abruptly changes.

While the present invention has been described in connection with specific embodiments accompanied by the attached drawings, it will be readily apparent to those skilled in the art that various changes and modifications may be made thereto without departing from the gist of the present invention.

What is claimed is:

1. A circuit for detecting a mirror signal from an output signal of an RF (radio frequency) amplifier for amplifying a signal picked up from a disk of an optical disk drive with a radio frequency, comprising:

a first peak hold circuit for holding a peak value of the output signal of said RF amplifier to provide a first peak value;

a first bottom hold circuit for holding a bottom value of the output signal of said RF amplifier to provide a first bottom value;

a differential amplifier for amplifying a difference between said first and second peak values;

a second peak hold circuit for holding a peak value of an output signal of said differential amplifier to provide a second peak value;

a second bottom hold circuit for holding a bottom value of the output signal of said differential amplifier to provide a second bottom value;

a centered value extractor for processing said second peak and second bottom values to extract a centered value of the output signal of said RF amplifier;

a first comparator for comparing said centered value with the output signal of said differential amplifier to generate said mirror signal; and a hold time constant adjustment circuit connected between said centered value extractor and said second peak and second bottom hold circuits to adjust time constants of said second peak and second bottom hold circuits according to a change in a level of the output signal of said RF amplifier.

2. A circuit for detecting a mirror signal as defined in claim 1, wherein said hold time constant adjustment circuit farther comprises:

a reference voltage generator for generating a reference voltage to detect the change in the level of the output signal of said RF amplifier;

a second comparator for comparing said second peak value with the sum of said second bottom value and reference voltage;

an adjustment resistor arranged between said second peak and second bottom hold circuits to adjust the time constants of said second peak and second bottom hold circuits; and a switch for selectively connecting or disconnecting said adjustment resistor between said second peak and second bottom hold circuits according to the output signal of said second comparator.

3. A circuit for detecting a mirror signal as defined in claim 2, wherein said reference voltage generator further includes:

a first, a second and a third resistor connected in series between a source voltage and ground voltage;

a first buffer having an input connected between said second and third resistors and an output connected to one input of said second comparator; and a second buffer having an input connected between said first and second resistors and an output connected to the other input of said second comparator.

4. A circuit for detecting the mirror signal as defined in claim 2, wherein said adjustment resistor has a resistance value lower than both a first resistance associated with the discharging time constant of said second peak hold circuit and a second resistance associated with the charging time constant of said second bottom hold circuit.

5. A circuit for detecting a mirror signal as defined in claim 3, wherein the total resistance of said first and second resistors is lower than both the resistance associated with the discharging time constant of said second peak hold circuit and the resistance associated with the charging time constant of said second bottom hold circuit.

6. A method of detecting a mirror signal used for counting a number of tracks of a disk jumped by a pickup of an optical disk drive, comprising the steps of:

detecting a difference between peak and bottom values of a whole signal read by said pickup during said jumping so as to generate a differential signal;

obtaining a centered value between the peak and bottom values of said differential signal;

adjusting charging and discharging time constants used for detection of the peak and bottom values of said differential signal according to a variation between the peak and bottom values of said differential signal;

comparing said differential signal with the centered value according to the variation of said charging and discharging time constants so as to generate said mirror signal.

7. A method of detecting a mirror signal as defined in claim 6, wherein said charging and discharging time constants are adjusted when the variation between the peak and bottom values of said differential signal is greater than a predetermined reference signal providing a reference to determine an abrupt change of a DC level of the whole signal.

8. An optical disk drive comprising:

an optical disk;

a pickup for reading data recorded on said optical disk to generate a whole signal;

a mirror signal detector for detecting a difference between peak and bottom values of said whole signal to generate a differential signal, obtaining a centered value between the peak and bottom values of said differential signal, adjusting charging and discharging time constants used for detection of the peak and bottom values of said differential signal according to variation between the peak and bottom values of said differential signal, and comparing said centered value according to variation of said charging and discharging time constants with said differential signal so as to generate a mirror signal; and a servo controller for counting a number of tracks jumped by said pickup according to said mirror signal to move said pickup to a targeted track.

9. An optical disk drive as defined in claim 8, wherein said mirror signal detector adjusts said charging and discharging time constants when the variation between the peak and bottom values of said differential signal is greater than a predetermined reference signal providing a reference to determine an abrupt change of a DC level of the whole signal.

\* \* \* \* \*